United States Defensive Publication [19] (H) [11] T959,010
Hansen [43] June 7, 1977

[54] PRINTING INK RESIN COMPOSITION

[76] Inventor: David R. Hansen, 15918 Red Willow, Houston, Tex. 77043

[21] Appl. No.: 715,953

[22] Filed: Aug. 19, 1976

[51] Int. Cl.² ..... C08L 45/00; C08L 53/00
[52] U.S. Cl. ..... 260/829; 260/876 B

[57] ABSTRACT

A resin composition for use in printing ink compositions comprises (a) a block copolymer having at least two polymer end blocks A and at least one polymer mid block B, each block A being a non-elastomeric polymer block of a monoalkenyl arene and each block B being an elastomeric hydrogenated polymer block of a conjugated diene; and (b) an end block compatible resin having a softening point above about 100° C, said end block compatible resin being selected from the group consisting of coumarone-indene resins, vinyl toluene-alphamethyl styrene copolymers, alphamethyl styrene homopolymers, polyindene resins and polystyrene resins. The above resin composition when employed in printing ink compositions results in a much improved adhesion of the printing ink to certain wire coatings comprising the above block copolymer along with various fillers, extending oils, polymeric alphaolefins, and fire retardants.

7 Claims, No Sheets Drawing,

8 Pages Specification

The file of this unexamined application may be inspected and copies thereof may be purchased (849 O.G. 1221, Apr. 9, 1968).